United States Patent
DeGennaro et al.

(10) Patent No.: US 6,523,677 B1
(45) Date of Patent: Feb. 25, 2003

(54) LOW TENSION DUAL HELICAL CONVEYOR SYSTEM

(75) Inventors: Ronald J. DeGennaro, Holbrook, NY (US); Jerome J. Finazzo, Jr., Massapequa Park, NY (US); Paul Priebe, Lake Grove, NY (US); Thomas Wedell, Farmingville, NY (US)

(73) Assignee: Tarpaulin.COM, Inc., Plainview, NY (US)

( * ) Notice: Subject to any disclaimer, the term of this patent is extended or adjusted under 35 U.S.C. 154(b) by 0 days.

(21) Appl. No.: 09/713,489

(22) Filed: Nov. 15, 2000

(51) Int. Cl.⁷ .................. B65G 13/02; B65G 21/18; B65G 13/06
(52) U.S. Cl. ................... 198/778; 198/781.04
(58) Field of Search .............. 198/778, 781.03, 198/781.04, 831, 848, 849

(56) References Cited

U.S. PATENT DOCUMENTS

| | | | |
|---|---|---|---|
| 2,011,786 A | | 8/1935 | Walker |
| 2,788,140 A | | 4/1957 | Becker |
| 3,348,659 A | | 10/1967 | Roinestad |
| 3,664,487 A | | 5/1972 | Ballenger |
| 3,682,295 A | | 8/1972 | Roinestad |
| 3,687,274 A | | 8/1972 | Clark et al. |
| 3,838,767 A | | 10/1974 | Taylor |
| 4,033,451 A | | 7/1977 | Kelsall |
| 4,036,352 A | | 7/1977 | White |
| 4,078,655 A | | 3/1978 | Roinestad |
| 4,089,407 A | | 5/1978 | Bullivant |
| 4,184,588 A | | 1/1980 | Lapeyre |
| 4,189,047 A | | 2/1980 | Beckius |
| 4,613,037 A | | 9/1986 | Park et al. |
| 4,741,430 A | | 5/1988 | Roinestad |
| 4,846,339 A | | 7/1989 | Roinestad |
| 4,858,750 A | * | 8/1989 | Cawley .................. 198/778 |
| 4,941,566 A | | 7/1990 | Irwin |
| 4,997,365 A | | 3/1991 | Lanham |
| 5,133,449 A | | 7/1992 | Spangler |
| 5,139,135 A | | 8/1992 | Irwin et al. |
| 5,141,099 A | | 8/1992 | Baumgartner |
| 5,191,267 A | | 3/1993 | Machacek |
| 5,228,557 A | * | 7/1993 | Lago ................. 198/778 X |
| 5,350,056 A | | 9/1994 | Hager |
| 5,398,521 A | | 3/1995 | Baron et al. |
| 5,566,817 A | | 10/1996 | Meeker |
| 5,743,376 A | | 4/1998 | Ochs |
| 5,787,716 A | | 8/1998 | Allen, Jr. |
| 5,803,232 A | | 9/1998 | Fröderberg |
| 5,906,270 A | | 5/1999 | Faulkner |

FOREIGN PATENT DOCUMENTS

| | | |
|---|---|---|
| DE | 862 427 | 10/1951 |
| JP | 4-217504 | 8/1992 |

* cited by examiner

Primary Examiner—Christopher P. Ellis
Assistant Examiner—Gene O. Crawford

(57) ABSTRACT

A dual helical conveyor system, is disclosed having a conveyor belt adapted to move in a first direction along a first helical path and thereafter in a second direction generally opposite the first direction along a second helical path generally concentric with said first helical path. The conveyor belt is further movable through a cross-over section along a cross-over path which connects the first and second helical paths, and a conveyor belt drive mechanism is provided in the cross-over section to frictionally drive the conveyor belt along the cross-over path and between the first and second helical paths. The conveyor belt is driven by friction/slip drive mechanism along the first and second helical paths. The conveyor in the first and second paths may be a single continuous belt or it may be alternatively be comprised of two separate and independent belts. When the conveyor in the first and second paths is comprised of separate and independent conveyor belt systems, communication between the product/discharge end of each system is provided by a third conveyor belt system. Independent friction/slip drive mechanisms are respectively provided for the first and second conveyor paths.

29 Claims, 7 Drawing Sheets

LOW TENSION DUAL HELICAL CONVEYOR SYSTEM

BACKGROUND OF THE INVENTION

1. Field of the Invention

The present invention relates to a low tension dual helical conveyor systems capable of conveying articles along concentric helical paths having mutually opposite directions of travel.

2. Description of the Related Art

Endless conveyors of the type contemplated herein generally include an endless conveyor belt which has sufficient flexibility to allow the belt to travel over concentric helically shaped paths having opposite directions of travel from a product input station to a product discharge station. Since the path is helical, the belt must be capable of flexing at least to a limited extent along at least three mutually orthogonal axes in order to permit the belt to follow such a relatively complex path. With concentric helical paths, the flexibility of the belt along several axes is increasingly significant, particularly when the helical paths are connected by a cross-over section of conveyor belt.

In order to permit such multi-directional flexing, such conveyor belts are generally constructed of a plurality of interconnected links which permit at least limited link-to-link articulation along two or more mutually orthogonal axes. In such instances, the links are generally constructed of materials such as steel, plastics, combinations thereof or the like, making the weight of the belt a relatively significant factor in operating the conveyor system.

Conveyor belts of the type contemplated herein generally range from about 12 inches to about 60 inches in width, and above about 200 feet in length. Although single helical conveyors generally may be of length up to about 5,000 feet, the possible length of such conveyors is virtually unlimited. When a conveyor belt is constructed of numerous interlocked steel links and is between 12 and 60 inches in width and more than 200 feet in length, the substantial weight of the belt becomes a significant factor to reconcile. For example, the belt must be driven through the work path which begins at the product input station and ends at the product discharge station. Thereafter, the belt enters the return section where it reverses direction and re-enters the product input station to continue operating in its endless path. In helical conveyors, the belt is driven up a helical shaped path in an up-go conveyor, and down a helical shaped path in a down-go conveyor.

In certain systems, such as the dual concentric conveyor systems disclosed in U.S. Pat. Nos. 3,664,487 and 4,036,352, the belt is driven by positive drive forces provided by drive members such as rotating drive angles driven on one side of the helical loops. In other systems in which a single helical path is defined, the belt is driven by friction forces imparted to it along the inner edge by a circular shaped rotating cage having friction/slip members attached to it and around which the belt is wrapped in the work zone. When the belt is friction driven, it generally is also provided with additional assistance by a motor driven sprocket which is constructed and arranged to engage the links of the belt directly as it is rotatably driven by the assist motor. Such motor assist is particularly needed in up-go helical conveyors where the relatively heavily weighted belt is made to traverse an up-go helical path against the force of gravity. A motor driven assist sprocket is also utilized in helical shaped down-go conveyors, although the gearing and roller arrangements differ somewhat from the up-go conveyors, and the assist force required is somewhat different.

In general, positively driven belts are subjected to greater tensile forces then the belts which are driven by friction forces due in part to the fact that the friction drive surface is generally moving at a faster rate of speed than the rate of speed of the driven edge of the belt. For example, when a friction driven belt of about 36 inches in width travels one revolution, the friction drive mechanism will travel approximately 36 inches further than the corresponding driven edge of the belt.

Conveyor belts of the type contemplated herein are generally used for conveying products under various conditions. For example, in some applications, the belts are used to convey dough products through relatively high temperature atmospheres in order to assist the dough in rising prior to formation of a bread product. In other applications, the belts may be made to carry food products through relatively cold atmospheres, sometimes under freezing conditions. In still other applications, the belts may be required to conduct products at room temperature.

In each instance, the belt, being made of a plurality of interlocked metal links, will react to the surrounding conditions such as temperatures, cleanliness and the like, with the result that the belt will undergo a natural stretch or compression. Such factors will, in turn, affect the belt tension. For example, some instances, the belt will become longer during operation and, in others, the belt may become shorter. Such variations sometimes make it relatively difficult to drive the belt by friction drive devices, since positively driven systems are relatively less complicated to control.

Dual concentric helical conveyor systems of the type disclosed in U.S. Pat. Nos. 3,664,487 and 4,036,352, which are positively driven, generally utilize conveyor belts which are permanently curved to meet the curvature of the helical conveyor paths and to accommodate the positive drive systems. In such instances, the permanent curvature in the belt also accommodates the transitional portion—or cross-over section—which connects both main conveyor systems. Further, the permanent curvature accommodates the positive drive mechanism by providing relative synchronized precision between the positive drive mechanism and the belt in both of the main conveyor sections.

Positively driven dual concentric helical conveyor systems have a number of disadvantages. For example, the preset curvature in the belt limits the location and angle of the "product infeed/product discharge" sections. Also, the preset curved nature of the belt prevents reversing the belt to reduce wear and increase belt life. Moreover, the significant tension to which the belt is normally subjected by the positive drive mechanism tends to increase belt wear and limit belt life. We have invented a dual concentric conveyor belt system which incorporates low tension friction drive systems in both of the main conveyor sections which permits the use of a normally straight flexible conveyor belt. In addition, we have invented a low tension friction drive system which can be incorporated into the cross-over section of the main conveyor sections in a manner to communicate the main conveyor sections with a low tension friction drive system, independent of whether the main sections are driven by friction or by positive drive devices, all while reducing the wear on the conveyor belt.

SUMMARY OF THE INVENTION

The invention relates to a dual helical conveyor system, which comprises a conveyor belt adapted to move in a first direction along a first helical path and thereafter in a second direction generally opposite the first direction along a second helical path inside the first helical path. Preferably the first and second helical paths are generally concentric. The conveyor belt is further movable through a cross-over section along a cross-over path connecting the first and second helical paths. A conveyor belt drive mechanism is provided in the cross-over section to frictionally drive the conveyor belt along the cross-over path and between the first and second helical paths. The conveyor belt is driven by a first friction drive mechanism along the first helical path, and a second friction drive mechanism along the second helical path. The conveyor belt defines a product input/discharge section at at least two locations, and a conveyor belt return device is provided to guide the conveyor belt between the first and second helical paths. The conveyor belt return device comprises a generally circular shaped guide member mounted for rotation at a location between the product input/discharge sections to guide the conveyor belt therebetween.

The first friction drive mechanism comprises a first rotatable drive cage positioned adjacent an inner edge of the conveyor belt along the first helical path, the first drive cage having first friction drive devices attached thereto and positioned in engagement with the inner edge of the conveyor belt to frictionally drive the conveyor belt along the first helical path. The second friction drive mechanism comprises a second rotatable drive cage positioned adjacent an inner edge of the conveyor belt along the second helical path, the second drive cage having second friction drive devices attached thereto and positioned in engagement with the inner edge of the conveyor belt to frictionally drive the conveyor belt along the second helical path. The first and second friction drive devices on the first and second rotatable drive cages are preferably made of resinous material, preferably ultra high molecular weight polyethylene.

Preferably, the first and second drive cages are independently driven by respective power drive systems, and each power drive system comprises a power drive device having a cage drive member connected thereto to rotatably drive an associated drive cage. The cage drive members each comprise a link chain which is driven by the respective power drive system. Although each power drive device is preferably driven by an electric motor as will be disclosed herein, alternatively other known power drive systems such as hydraulically powered drive systems or the like may be utilized.

The conveyor belt drive mechanism adjacent the cross-over path comprises a plurality of friction driven members positioned in moving frictional engagement with an edge portion of the conveyor belt along at least a portion of the cross-over path to frictionally drive the conveyor belt between the first and second helical paths. The friction drive members are preferably made of resinous material, preferably ultra high molecular weight polyethylene.

The conveyor belt drive mechanism adjacent the cross-over path comprises a link chain adapted to move along an endless path adjacent the cross-over path, and the ultra high molecular weight polyethylene friction drive members are attached to the movable link chain.

In a preferred embodiment, a dual helical conveyor system is disclosed which comprises an endless conveyor belt adapted to move in a first direction along a first helical path portion and thereafter in a second direction generally opposite the first direction along a second helical path portion inside the first helical path. Preferably the first and second path portions are generally concentric. Movable friction/slip drive devices are positioned in engagement with an inner edge portion of the belt in the first helical path portion, and movable friction/slip drive devices are positioned in engagement with an inner edge portion of the conveyor belt in the second helical path portion. The conveyor belt is further movable along a cross-over path which connects the first and second helical paths, and a conveyor belt drive mechanism is positioned adjacent the cross-over path. The conveyor belt drive mechanism includes movable friction/slip members positioned in engagement with an inner edge portion of the conveyor belt in the cross-over section to provide force sufficient to assist movement of the conveyor belt between the first and second helical paths.

According to one embodiment, the dual helical conveyor system comprises a first helical conveyor section having a first conveyor belt adapted to move in a first direction along a first helical path, and a second helical conveyor section having a second conveyor belt adapted to move in a second direction opposite the first direction along a second helical path and located inside the first helical path, preferably concentric therewith. Each of the first and second conveyor belts have associated therewith a friction drive mechanism which comprises a rotatable cage having friction drive members attached thereto and positioned in moving frictional/slip engagement with an inner edge portion of the associated conveyor belt to drive the associated conveyor belt along the respective helical path. Each of the first and second helical conveyor sections include a product input/discharge section for receiving and/or discharging products in dependence upon the direction of the respective conveyor belt. The system further comprises a third conveyor section extending between the product input/discharge sections to convey products therebetween. The third conveyor section preferably has an arcuate configuration and is positively driven by positive drive members. Alternatively, the third conveyor section may be driven by a friction drive device having a plurality of friction/slip drive members in movable engagement with an edge portion of the conveyor section. The friction drive device associated with the third conveyor section preferably comprises a link chain having a plurality of friction/slip drive members attached thereto and positioned in movable engagement with the edge portion of the third conveyor section.

In another embodiment, the dual helical conveyor system comprises a first helical conveyor section having a first conveyor belt adapted to move in a first direction along a first helical path, and a second helical conveyor section having a second conveyor belt adapted to move in a second direction opposite the first direction of the first belt along a second helical path inside, but preferably concentric with the first helical path. Each of the first and second conveyor sections are independently driven by respective independently controlled friction drive mechanisms and have respective product input/discharge sections. A third conveyor section is positioned and adapted to carry products between the product input/discharge sections of the first and second helical conveyor sections. The third conveyor section preferably has an arcuate configuration and a friction/slip drive mechanism is provided to drive the conveyor section. Alternatively, a positive drive mechanism may be provided to drive the third conveyor section.

BRIEF DESCRIPTION OF THE DRAWINGS

Preferred embodiments of the invention are described hereinbelow with reference to the drawings, wherein.

DETAILED DESCRIPTION OF THE PREFERRED EMBODIMENTS

Figure 1:
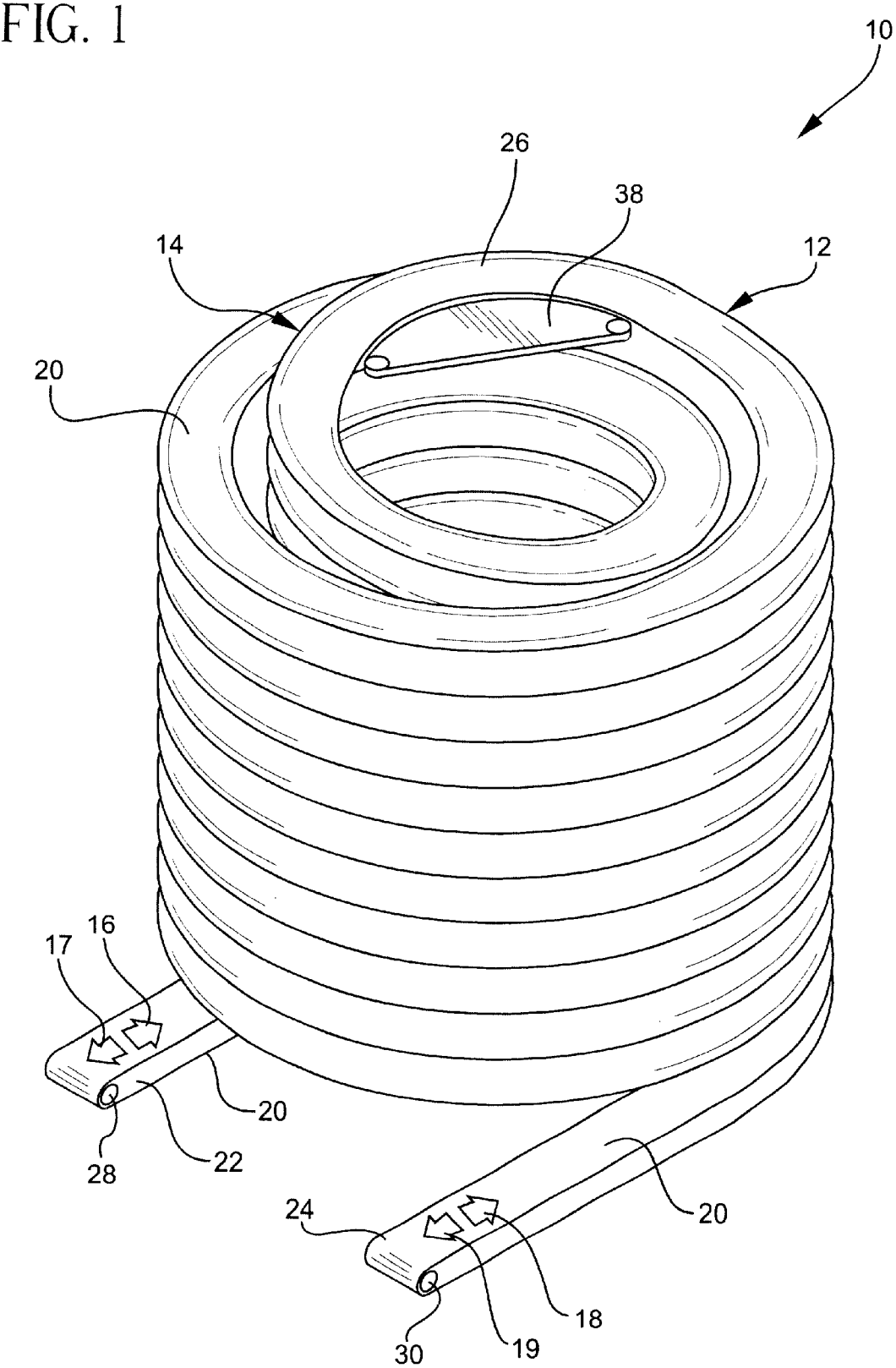
FIG. 1 is a right side perspective view of an endless friction driven low tension dual helical conveyor system constructed according to the present invention, capable of conveying articles along concentric ascending and descending helical paths, and illustrating a friction drive device in the cross-over section between the helical paths.

Referring initially to FIG. 1, there is shown a perspective view of a low tension dual helical conveyor 10 constructed according to the invention. Conveyor 10 includes external helical conveyor section 12 which surrounds internal helical conveyor section 14 as shown. Although it is preferred that the external helical conveyor section 12 is concentric with the internal helical conveyor 14 as shown (i.e. having a common center), it is also contemplated that the invention can be practiced wherein conveyor sections 12 and 14 have different centers of rotation.

As indicated by the direction of arrows 16, 17, 18, 19, depending upon the selected direction of movement of each conveyor section 12, 14, the outer section 10 can function as an ascending or "up-go" conveyor, while the inner conveyor section 14 can function as a descending or "down-go" conveyor. Further, by reversing the direction of movement of the conveyor belt, outer conveyor section 12 will function as a descending, or "down-go" conveyor, and inner conveyor section 14 will function as an ascending, or "up-go" conveyor. The conveyor belt 20 is flexible and is generally made of metal, plastic, combinations thereof, or the like. Such belt is generally constructed of collapsibly interconnected multi-directionally articulated links which make it capable of flexing or bending along at least two, but preferably three mutually orthogonal directions so as to be directed along a continuously changing arcuate path to assume a helical shape as shown in FIG. 1. The belt 20 includes a plurality of links connected together by cross rods to permit selective, sometimes limited, bending along three orthogonal directions as noted.

In general, the belt is most flexible about an axis perpendicular to the direction of movement, while limited flexible articulation is permitted about the remaining two orthogonal axes. The belt can generally be folded over upon itself about the axis perpendicular to the direction of travel, while the limited flexibility permitted about the remaining two axes generally requires limited flexible bending of the links, particularly at the link-to-link connections. The links are generally of steel construction, making the weight of the belt a relatively significant factor in the operation of the conveyor.

Conveyor belt 20 and the helical drive system of the present conveyor are of the type disclosed in commonly assigned co-pending application Ser. No. 09/631,337, filed Aug. 3, 2000, the disclosure of which is incorporated herein by reference and made part of this disclosure. As noted, another example of a dual concentric endless conveyor belt construction is described in U.S. Pat. No. 3,664,487 to Ballenger, the disclosure of which is incorporated herein by reference and made a part of this disclosure. Still another example of such belt construction is disclosed in U.S. Pat. No. 4,846,339 to Roinestad, the disclosure of which is incorporated herein by reference and made part of this disclosure. Conveyor belts of flexible construction of the types disclosed herein are contemplated.

U.S. Pat. No. 3,682,295 to Roinestad relates to an edge driven conveyor system in which a frictional edge drive is provided to support the belt, and which includes a friction edge drive in combination with any of several means to maintain the belt in the requisite driving engagement with the edge drive. The disclosure of U.S. Pat. No. 3,682,295 is incorporated herein by reference and made a part of this disclosure.

Referring again to FIG. 1, flexible conveyor belt 20 is endless and forms a helical path which begins adjacent the infeed/discharge section 22, 24 where products are introduced or discharged in dependence upon the direction of movement of the belt 20. When the direction of the belt 20 is as indicated by arrow 18, products (i.e. food products such as bread, etc.) are introduced at product input 24 in the direction of arrow 18, they are made to travel over an ascending helical path on outer conveyor section 12. Thereafter the product path enters a cross-over section 26 which directs the belt to the inner descending helical conveyor 14 which ultimately leads to product discharge section 22 as indicated by product direction arrow 17.

When the direction of conveyor belt 20 is reversed as indicated by arrow 16, products are introduced at product input 22 in the direction of arrow 16, and are made to follow an ascending path on inner ascending helical inner conveyor 14. When the products reach the uppermost level of inner conveyor 14, they enter the cross-over section 26 which directs them to outer helical conveyor 12 which is now in a descending mode, and thereafter to product discharge section 24 while moving in the direction of arrow 19.

Figure 5:
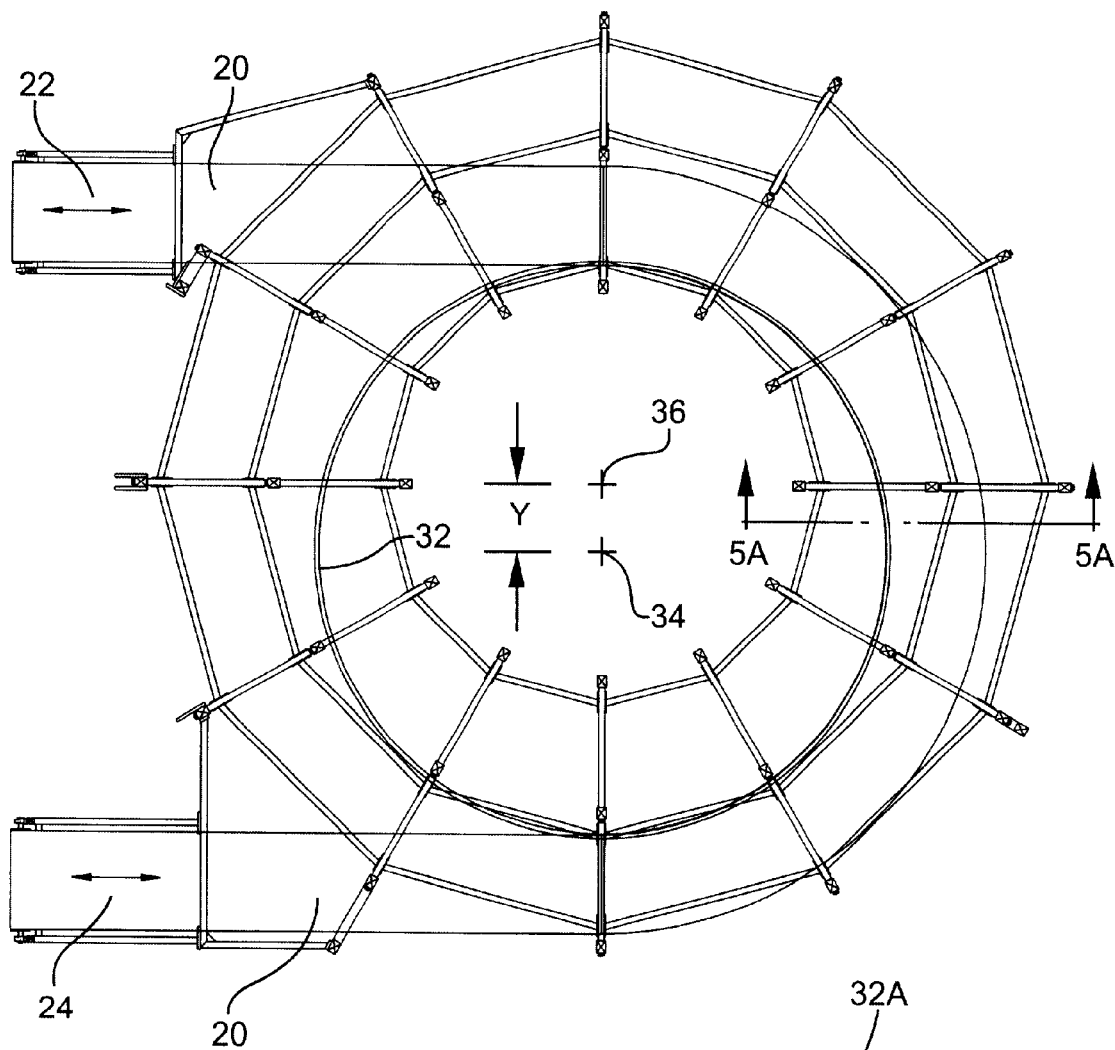
FIG. 5 is a partially schematic plan view of the dual helical conveyor system of FIG. 1, illustrating the conveyor belt return system in the lowermost portion of the conveyor, and the locations of the product input, product discharge sections.
Figure 5A:
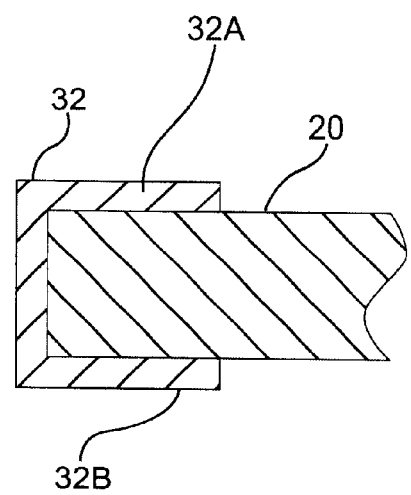
FIG. 5A is a cross-sectional view taken along lines 5A—5A of FIG. 5, illustrating the conveyor belt return channel guide.

As noted, the conveyor belt 20 is flexible at least to a limited extent, and endless in that when it exits product discharge section 22, 24 (depending upon the belt direction at any given time) it wraps around respective rollers 28, 30 and reverses direction. Upon reversing direction, the belt is guided about the freely rotatable guide 32, which is located at or near the lowermost level of the conveyor. Freely rotatable belt guide 32 is best shown schematically in FIG. 5. Preferably, guide 32 is a freely rotating bearing mounted circular shaped guide having a channel-like cross-section which receives and guides the inner edge of the conveyor belt 20 between input/discharge section 22 and input/discharge section 24, in dependence upon the direction of movement of the belt 20, as shown schematically in FIGS. 1 and 5. FIG. 5A is a cross-sectional view taken along lines 5A—5A of FIG. 5, illustrating guide channel 32 with flexible belt 20 shown schematically and positioned between upper and lower flanges 32A, 32B. The belt 20 is guided along the circular path defined by guide channel 32 as shown in FIG. 5 between product input/discharge sections 22, 24. As can be seen from FIG. 5, although outer helical conveyor section 12 is concentric with inner helical conveyor section 14, the freely rotating belt return guide 32 is not concentric with either of helical sections 12 or 14 and its axis of rotation 34 is offset by dimension "Y" from the axis of rotation 36 of helical conveyor sections 12, 14.

Figure 4:
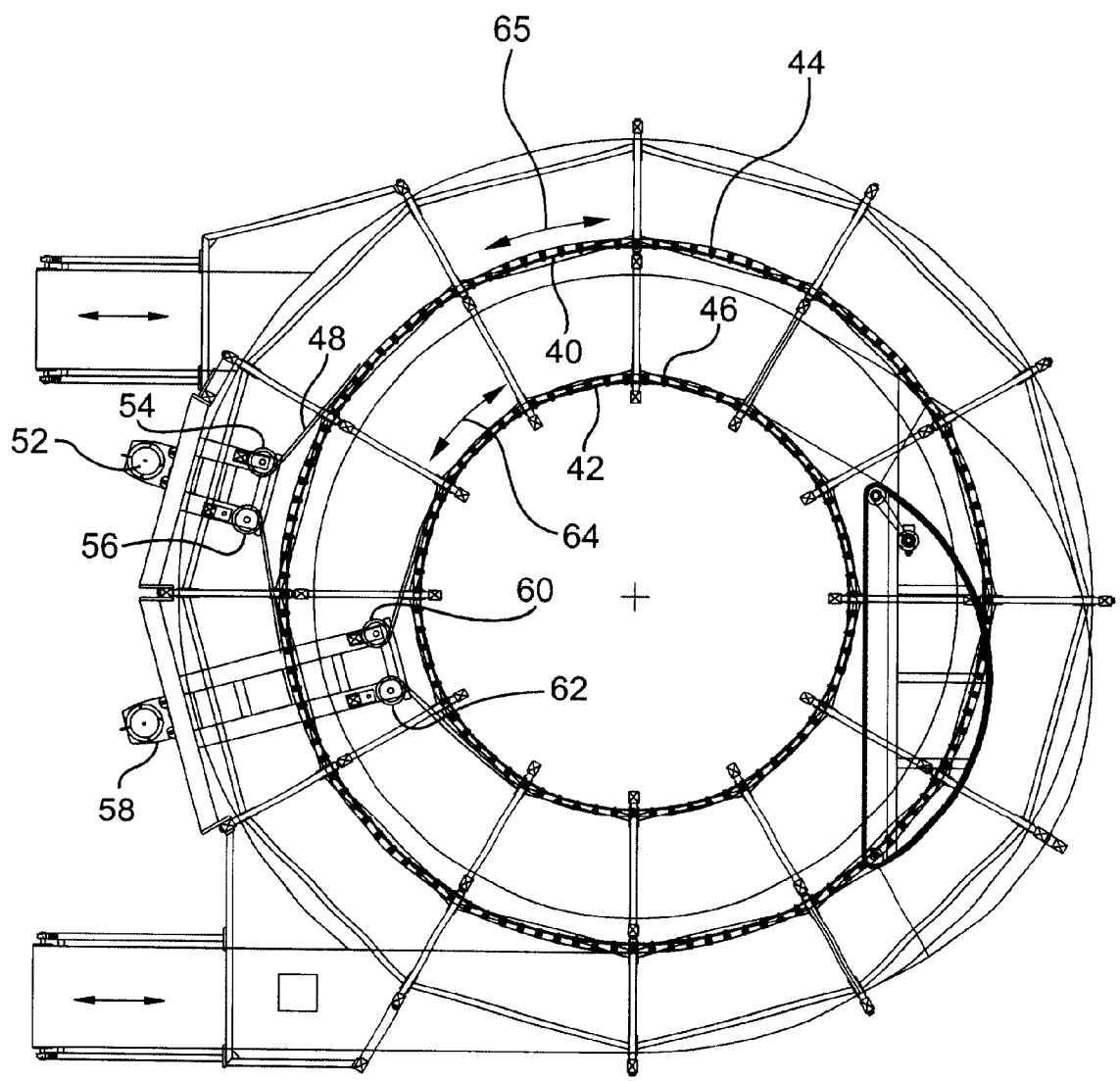
FIG. 4 is a partially schematic plan view of the dual helical conveyor system of FIG. 1, illustrating the upper frame structure, the dual independent helical drive system, and the friction drive device of the cross-over section.

Referring now to FIG. 4 in conjunction with FIG. 1, when belt 20 of helical conveyor sections 12, 14 is of metal construction, each section 12, 14 is respectively driven by rotating cages 40, 42 which are constructed of a metal framework having attached thereto and facing radially outwardly therefrom, members 44, 46 fabricated of a suitable low friction/slip material such as ultra high molecular weight polyethylene, and generally referred to as "UHMW". Other suitable low friction resinous materials are also contemplated, including polyamides such as nylon, or other polyolefins, for example. When the belt 20 is constructed of plastic, or combinations of plastic and metal, the friction/slip members of the drive cage may be constructed of a metal such as stainless steel, or a combination of plastic and steel, depending upon the precise material and construction of the inner edge of the driven belt. The individual members 44,46 of cages 40, 42 are attached to the cage framework to form a circular array of low friction members. Each of cages 40, 42 is respectively rotated by an endless motor driven chain 48, 50.

In particular, motor 52 rotatably drives a sprocket (not shown) which in turn rotates sprockets 54, 56, which drive endless chain 48 along an endless path about the UHMW outer drive cage 40. Similarly, motor 58 rotatably drives a sprocket (not shown) which in turn rotates sprockets 60, 62 which drive endless chain 50 along an endless path about UHMW inner drive cage 42. The driving mechanism between the chains 48, 50 and the cages 40, 42, include a plurality of sprocket teeth extending radially outward from cages 40, 42 and spaced circumferentially from each other so as to be progressively engaged by drive chains 48, 50 so as to continuously rotate cages 40, 42 positively in either of two alternative rotational directions as indicated by arrows 64, 65. Alternatively, other power drive systems can be used in place of electric motors 52, 58, such as hydraulic power drive systems or the like.

Referring again to FIG. 4 in conjunction with FIG. 1, outer cage 40 and inner cage 42 rotate continuously in the same rotational direction while UHMW members 44, 46 frictionally engage the inner edge of the respective section of conveyor belt to cause the outer conveyor belt section 12 to move in one direction (i.e. either up or down) while causing the inner concentric conveyor belt section 14 to move in the opposite direction. As will be appreciated, the direction of movement of outer conveyor section 12 and concentric inner conveyor section 14 can readily be reversed by reversing the direction of rotation of drive motors 52, 58 and respective drive chains 48, 50. The individual drive mechanism for each of conveyor sections 12, 14 is similar to the drive mechanism for the single helical conveyor as disclosed in commonly assigned co-pending application Ser. No. 09/631,337, filed Aug. 3, 2000, the disclosure of which is incorporated herein by reference and made a part of this disclosure.

Figure 2:
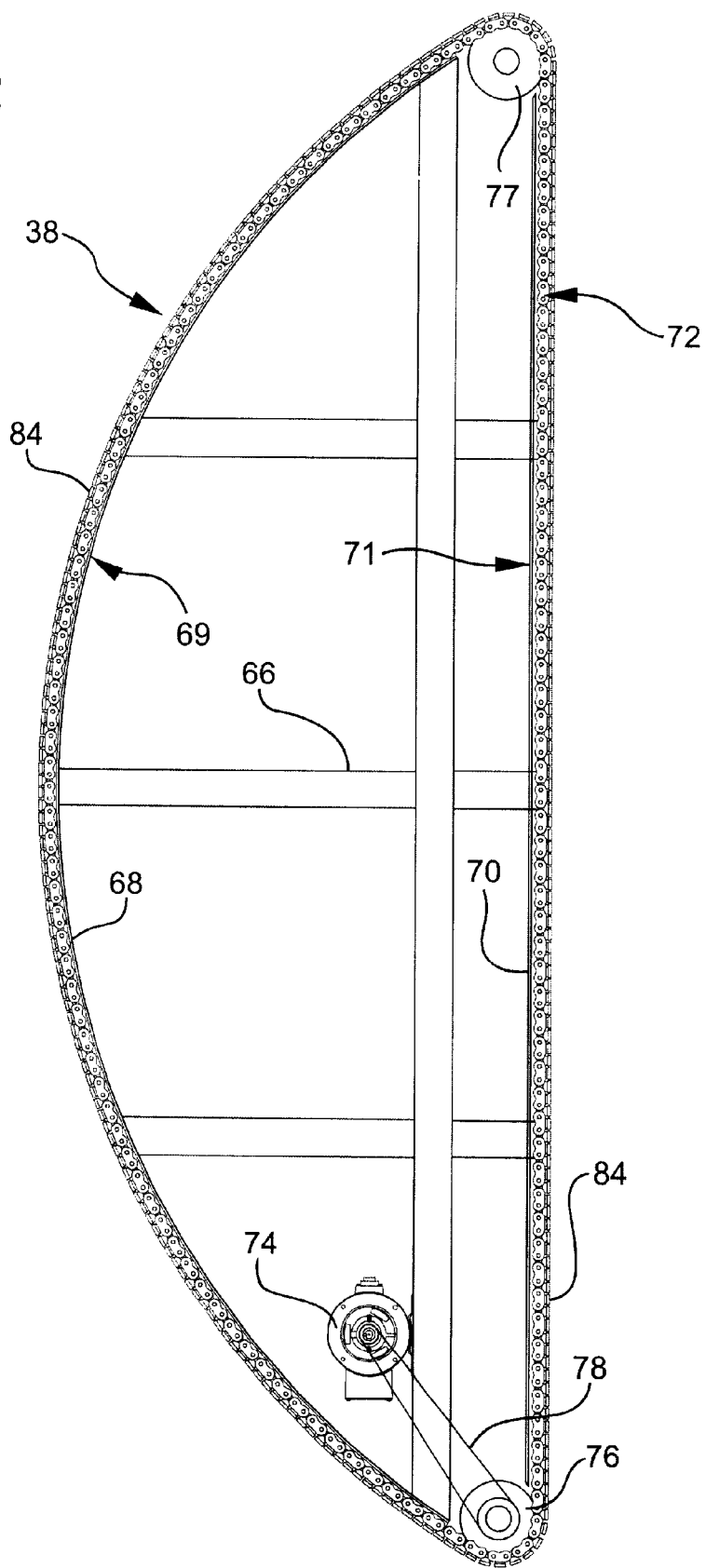
FIG. 2 is a plan view of the friction drive device of the cross-over section of the conveyor of FIG. 1.
Figure 3:
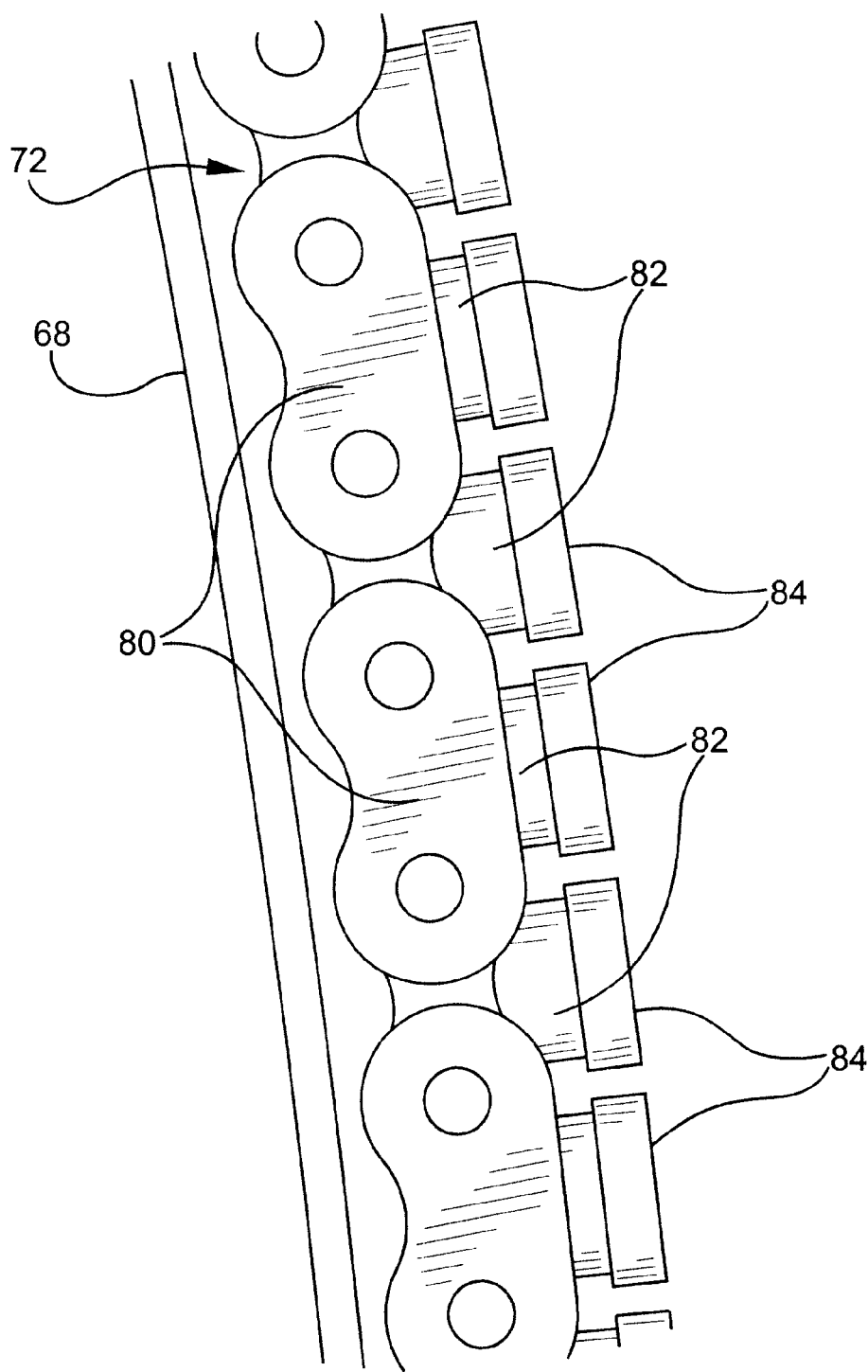
FIG. 3 is a plan view, greatly enlarged, of a portion of the friction drive device of FIG. 2, illustrating the link chain drive having friction drive plates attached thereto.

Referring now to FIGS. 2 and 3 in conjunction with FIGS. 1 and 4, the drive mechanism in the conveyor belt cross-over section 26 will now be described. Since the configuration of the articulating flexible belt 20 in the cross-over section 26 necessarily causes the belt to assume a continuously changing radius and configuration, at different locations, it has been generally difficult to provide the precise moving force required to maintain continuous movement of the conveyor belt in both the inner and the outer sections as well as in the cross-over section 26, while minimizing the tension in the belt. In prior art conveyors, positive drive devices increased belt tension. To accomplish the precisely controlled belt movement while generating minimum tension in the belt 20 in the cross-over section, cross-over drive mechanism 38 is configured as shown in FIGS. 2 and 3. Cross-over drive mechanism 38 is comprised of frame 66 having an outer arcuate section 68 and a straight section 70. Frame 66 supports a sprocket driven endless link chain 72 which is driven along a continuous endless path including arcuate path section 69 and straight path section 71 as shown. Electric drive motor 74 is arranged to rotatably drive toothed sprocket 76 via drive belt or chain 78 such that the teeth of sprocket 76 engage link chain 72 to drive it around idler sprocket 77 and along its endless path as shown.

As can be seen in FIG. 3, link chain 72 is formed of links 80 having flanges 82 extending outwardly therefrom. Flanges 82 each have a member 84 formed of ultra high molecular weight polyethylene (UHMW) and having a generally rectangular cross-section as shown. Members 84 are made to frictionally engage and drive the inner edge of the conveyor belt 20 in the cross-over section 26 between the outer conveyor section 12 and the inner conveyor section 14. Although link chain 72 is positively driven by electric drive motor 74 and toothed sprocket 76, the driving force of the conveyor belt 20 in the cross-over section 26 is actually provided by friction/slip engagement between the UHMW members 84 in a manner similar to the friction/slip engagement used to drive the conveyor belt 20 in the main outer section 12 and the main inner concentric section 14. It will be appreciated that by providing such unique friction/slip driving force, the tension of the belt in the cross-over section 26 and throughout the system can be controlled and minimized in contrast to the positively driven dual conveyor systems which are presently known. Furthermore, by utilizing such friction/slip drive system in the cross-over section 26 and in the main concentric sections 12, 14, it is now possible to utilize a conveyor belt of the type which is flexible and capable of articulation along three mutually orthogonal axes thus making it possible to reverse the belt to periodically equalize and reduce wear on the belt. Thus by reversing the top and bottom surfaces of the belt the friction/slip drive force will be applied to the previously unused edge, thereby reducing excessive wear on the driven edge. Additionally, the upper product surface wear will be reduced and the life of the belt extended.

Furthermore, as indicated in connection with external conveyor section 12 and internal conveyor section 14, UHMW is the preferred friction/slip material used to drive the belt 20 in cross-over section 26 when the belt 20 is of metal construction. However, when the belt is made of alternative materials such as plastic, metal, or combinations thereof, or other materials, friction/slip drive members 84 in the cross-over section 26 may be made of alternative materials compatible with the material or materials from which the belt is constructed. For example, when the belt 20 is constructed of plastic along the inner edge, friction/slip drive members 84 will preferably be made of a material such as metal.

Figure 6:
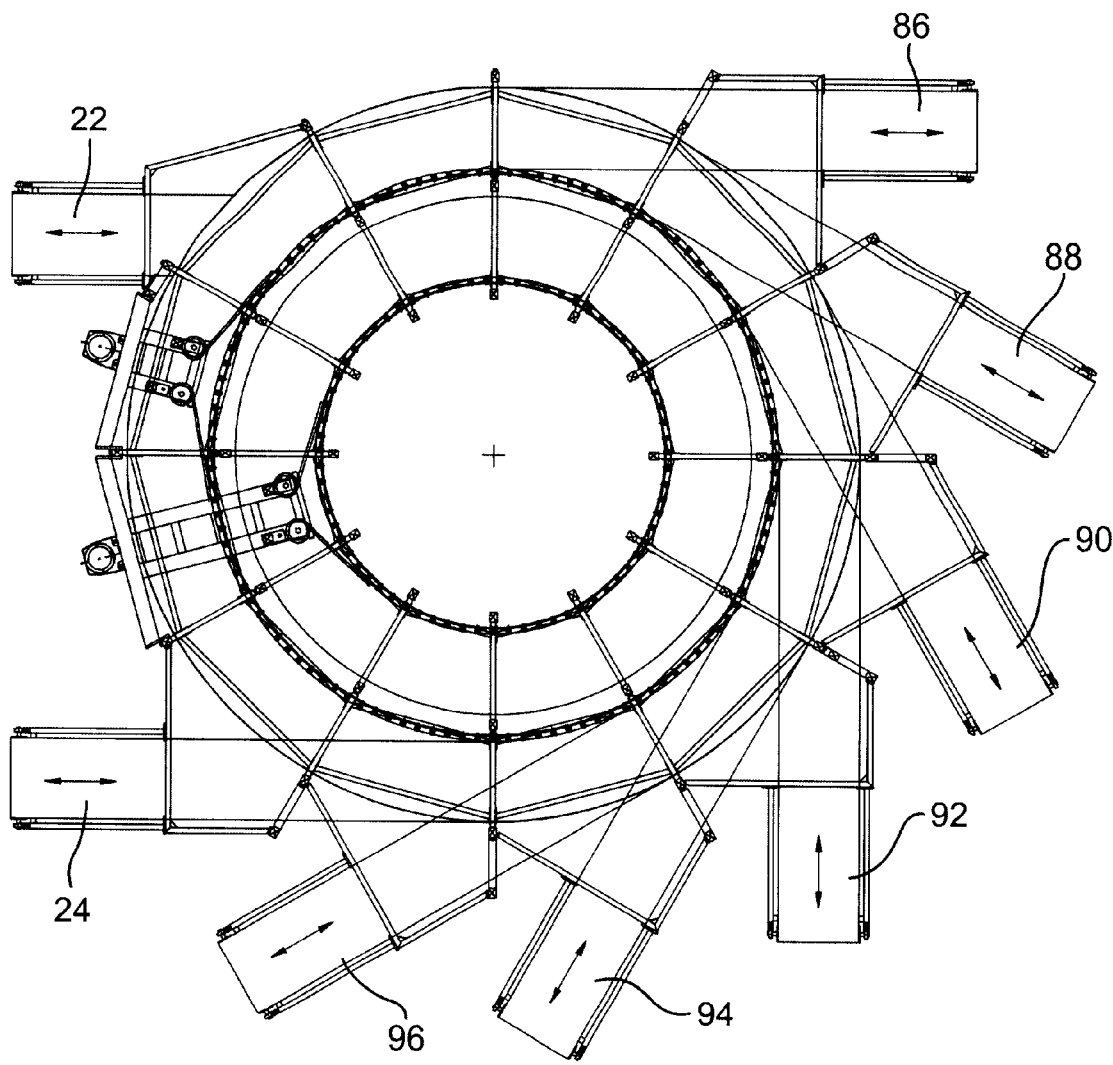
FIG. 6 is a partial schematic plan view of the dual helical conveyor of FIG. 1, illustrating various alternative directions and angular orientations available for the product input and product discharge sections, utilizing the flexible conveyor belt of the invention.

Referring now to FIG. 6, there is illustrated a significant advantage to the low tension endless dual helical conveyor constructed according to the present invention. By incorporating a flexible conveyor belt which articulates generally along three mutually orthogonal axes, the flexibility permits selective spacing of the two product input/discharge sections from each other by any desired or predetermined relative angular orientations by simply predetermining the length of the belt and structure of the corresponding framework. For example, whereas prior art positively driven dual concentric conveyor systems utilized conveyor belts having predetermined fixed curvatures along several directions (i.e. along the driven edge and on the top surface), the structure of the present system utilizes a flexible belt which has a straight and uncurved configuration in its normal state. Thus, the belt of the present dual concentric conveyor system can be designed to include product input/discharge sections at any predetermined locations along the periphery of the conveyor. For example, referring to FIG. 6, product input/discharge sections can be provided as shown at 22, 24 as is also illustrated in FIGS. 1 and 5. Alternatively as shown in FIG. 6, product input/discharge sections can also be provided at any selective pair of locations, such as the exemplary locations shown for example at 86, 88, 90, 92, 94 and 96. Although the examples of such locations is shown in FIG. 6 as illustrated, the locations for such product input/discharge locations is substantially unlimited and may be provided in any configuration desired by the end user. In particular, since the flexible articulating belt is initially straight and reversible as noted, locating the pair of product input/discharge sections for such dual conveyor is not limited due to the substantial flexibility of the belt which can be curved along either edge as well as about either the top or the bottom surfaces.

Figure 7:
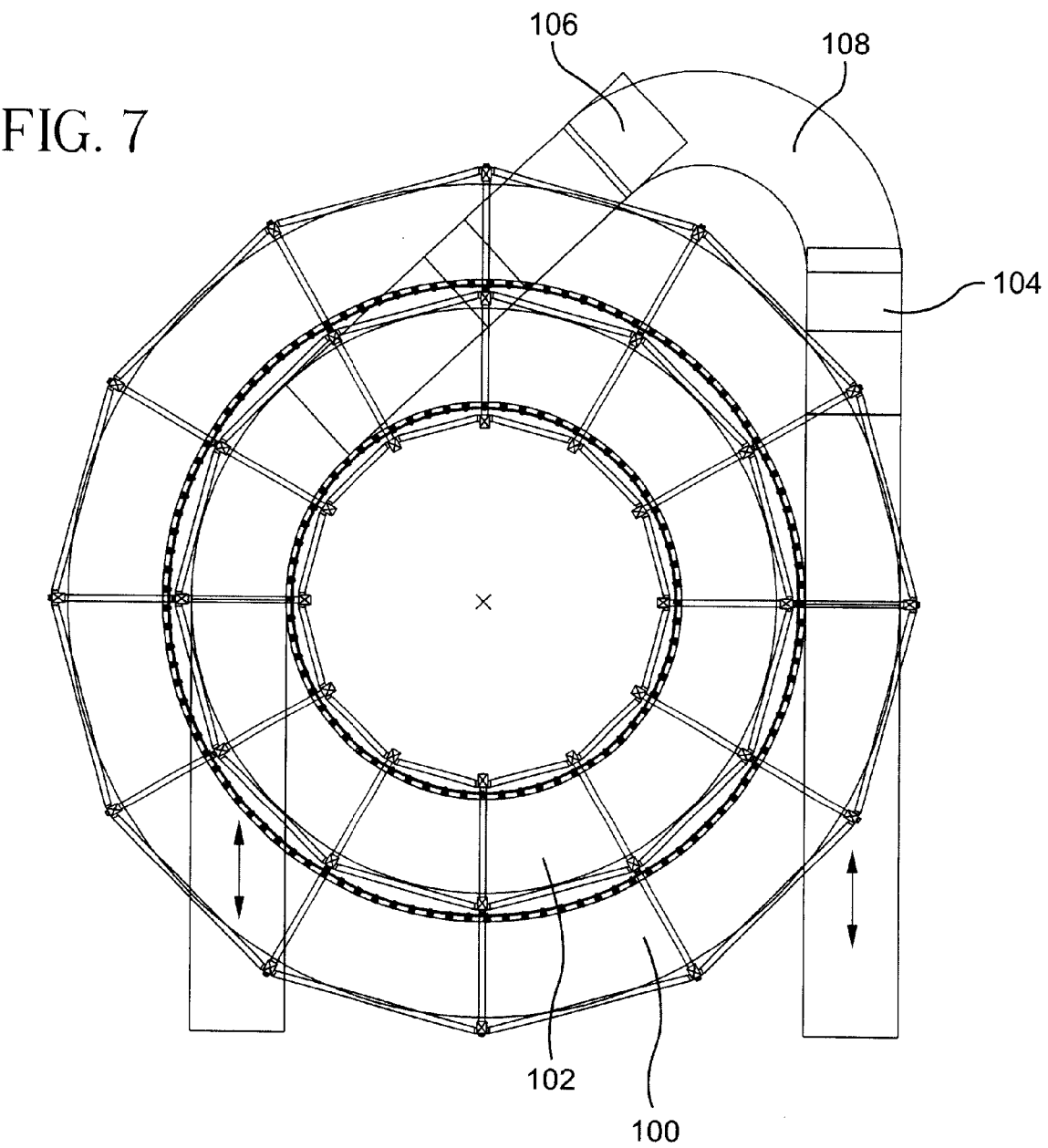
FIG. 7 is a partial schematic plan view of an alternative embodiment of the invention, wherein two concentric conveyor sections are separate and independently driven by friction or other type drive devices and product communication is provided by an arcuate conveyor communicating the product input/discharge section of one conveyor section with the product input/discharge section of the other concentric conveyor section.

Referring now to FIG. 7, there is disclosed an alternative embodiment of the invention wherein external helical conveyor section 100 surrounds internal helical conveyor section 102, preferably in generally concentric relation. Both external section 100 and internal section 102 are of the type disclosed in the aforementioned commonly assigned application Ser. No. 09/631,333 wherein a take-up section and a counterbalance weight is provided.

In the system shown in FIG. 7, external conveyor section 100 includes take-up section 104 and internal conveyor section 102 includes take-up section 106. At the top of the respective take-up sections 104, 106 is the respective product input/discharge sections as disclosed in application Ser. No. 09/631,337.

Referring again to FIG. 7, a third arcuately shaped conveyor section 108 is positioned and arranged to transport products between the product input/discharge sections 104, 106. Conveyor section 108 may be positively driven, or alternatively conveyor section 108 may be friction driven as described in connection with the previous embodiment. In either embodiment, the outer and inner helical conveyor sections 100, 102 are separately and independently driven by rotating friction-type drive cages as described in connection with the previous embodiment. As noted, since helical conveyor sections 100, 102 are separate and independently controlled, they also include a belt take-up section which permits excess conveyor belt to accumulate, with an appropriate counter-balance system whereby operational fluctuations in the length of the belt may be accommodated. The counter balance system may be of the fixed weight type as generally known in the art, or alternatively it may be of the type disclosed and claimed in application Ser. No. 09/631,337.

It will be understood that each of the elements described above, or two or more together, may also find a useful application in other types of constructions differing from the type described above. Further, while the invention has been illustrated and described as embodied in a low tension dual helical conveyor system, it is not intended to be limited to the details shown, since it will be understood that various omissions, modifications, substitutions and changes in the forms and details of the device illustrated, and in its operation, can be made by those skilled in the art without departing in any way from the spirit of the present invention as described and defined by the following claims.

What is claimed is:

1. A dual helical conveyor system, which comprises
a conveyor belt adapted to move in a first direction along a first helical path and thereafter in a second direction generally opposite said first direction along a second helical path generally concentric with said first helical path, said conveyor belt further movable through a cross-over section along a cross-over path connecting said first and second helical paths,
a conveyor belt drive mechanism in said cross-over section to frictionally drive said conveyor belt along said cross-over path and between said first and second helical paths, wherein said conveyor belt is driven by a first friction drive mechanism along said first helical path and a second friction drive mechanism along said second helical path, and wherein said conveyor belt defines a product input/discharge section at at least two locations, and
a conveyor belt return device to guide said conveyor belt between said first and second helical paths, wherein said conveyor belt return device comprises a generally circular shaped guide member mounted for rotation at a location between said product input/discharge sections to guide said conveyor belt therebetween.

2. The dual helical conveyor according to claim 1, wherein said guide member is located at a position offset from the center of rotation of said concentric paths and is bearing-mounted about the periphery thereof.

3. The dual helical conveyor system according to claim 1, wherein said first friction drive mechanism comprises a first rotatable drive cage positioned adjacent an inner edge of said conveyor belt along said first helical path, said first drive cage having first friction drive devices attached thereto and positioned in engagement with said inner edge of said conveyor belt to frictionally drive said conveyor belt along said first helical path.

4. The dual helical conveyor system according to claim 3, wherein said second friction drive mechanism comprises a second rotatable drive cage positioned adjacent an inner edge of said conveyor belt along said second helical path, said second drive cage having second friction drive devices attached thereto and positioned in engagement with said inner edge of said conveyor belt to frictionally drive said conveyor belt along said second helical path.

5. The dual helical conveyor system according to claim 4, wherein said first and second friction drive devices on said first and second rotatable drive cages are made of resinous material.

6. The dual helical conveyor system according to claim 5, wherein said resinous material is ultra high molecular weight polyethylene.

7. The dual helical conveyor system according to claim 6, wherein said first and second drive cages are independently driven by respective power drive systems, and each power drive system comprises a power drive device having a cage drive member connected thereto to rotatably drive an associated drive cage.

8. The dual helical conveyor system according to claim 7, wherein each said respective power drive device is powered by an electric motor or hydraulic motor.

9. The dual helical conveyor system according to claim 8, wherein each said cage drive members comprises a link chain which is driven by the respective electric motor or hydraulic motor.

10. The dual helical conveyor system according to claim 9, wherein said conveyor belt drive mechanism adjacent said cross-over path comprises a plurality of friction driven members positioned in moving frictional engagement with an edge portion of said conveyor belt along at least a portion of said cross-over path to frictionally drive said conveyor belt between said first and second helical paths.

11. The dual helical conveyor system according to claim 10, wherein said friction drive members are made of resinous material.

12. The dual helical conveyor system according to claim 11, wherein said resinous material is ultra high molecular weight polyethylene.

13. The dual helical conveyor system according to claim 12, wherein said conveyor belt drive mechanism adjacent said cross-over path comprises a link chain adapted to move along an endless path adjacent said cross-over path, and said ultra high molecular weight polyethylene friction drive members are attached to said movable link chain.

14. A dual helical conveyor system, which comprises an endless conveyor belt adapted to move in a first direction along a first helical path portion and thereafter in a second direction generally opposite said first direction along a second helical path portion generally concentric with said first helical path portion, first movable friction/slip drive devices positioned in engagement with an inner edge portion of said belt in said first helical path portion, second movable friction/slip drive devices positioned in engagement with an inner edge portion of said conveyor belt in said second helical path portion, said conveyor belt being further movable along a cross-over path which connects said first and second helical paths, a conveyor belt return guide to guide said conveyor belt between said first and second helical paths, said conveyor belt return device comprising a generally circular shaped guide member mounted for rotation at a location between said product input/discharge sections to guide said conveyor belt therebetween, wherein said first movable friction/slip drive devices comprise a first rotatable drive cage positioned adjacent an edge of said conveyor belt along said first helical path and said second movable friction/slip drive devices comprise a second rotatable drive cage positioned adjacent an inner edge of said conveyor belt along said second helical path.

15. The dual helical conveyor system according to claim 13, wherein said guide member is located at a position offset from the center of rotation of said concentric paths and is bearing-mounted about the periphery thereof.

16. The dual helical conveyor system according to claim 15, wherein said first and second drive cages are independently driven by respective power drive systems, each power drive system comprising a power drive device having a cage drive member connected thereto to rotatably drive an associated drive cage.

17. A dual helical conveyor system, which comprises an endless conveyor belt adapted to move in a first direction along a first helical path portion and thereafter in a second direction generally opposite said first direction along a second helical path portion generally inside said first helical path portion, first movable friction/slip drive devices positioned in engagement with an inner edge portion of said belt in said first helical path portion, second movable friction/slip drive devices positioned in engagement with an inner edge portion of said conveyor belt in said second helical path portion, said conveyor belt being further movable along a cross-over path which connects said first and second helical paths, a conveyor belt return guide to guide said conveyor belt between said first and second helical paths, said conveyor belt return device comprising a generally circular shaped guide member mounted for rotation at a location between said product input/discharge sections to guide said conveyor belt therebetween, wherein said first movable friction/slip drive devices comprise a first rotatable drive cage positioned adjacent an edge of said conveyor belt along said first helical path and said second movable friction/slip drive devices comprise a second rotatable drive cage positioned adjacent an inner edge of said conveyor belt along said second helical path.

18. The dual helical conveyor system according to claim 17, wherein said guide member is located at a position offset from the center of rotation of said second helical path portion and is bearing-mounted about the periphery thereof.

19. The dual helical conveyor system according to claim 18, wherein said first and second drive cages are independently driven by respective power drive systems, each power drive system comprising a power drive device having a cage drive member connected thereto to rotatably drive an associated drive cage.

20. A dual helical conveyor system, which comprises a first helical conveyor section having a first conveyor belt adapted to move in a first direction along a first helical path, and a second helical conveyor section having a second conveyor belt adapted to move in a second direction opposite said first direction along a second helical path and located inside said first helical path, each said first and second conveyor belt having associated therewith a friction drive mechanism which comprises a rotatable cage having friction drive members attached thereto and positioned in moving frictional/slip engagement with inner an edge portion of said associated conveyor belt to drive said associated conveyor belt along said respective helical path, each said first and second helical conveyor sections including a product input/discharge section for receiving and/or discharging products in dependence upon the direction of said respective conveyor belt, and further comprising a third conveyor section extending between said product input/discharge sections to convey products therebetween.

21. The dual helical conveyor system according to claim 20, wherein said third conveyor section has an arcuate configuration and is positively driven by positive drive members.

22. The dual helical conveyor system according to claim 21, wherein said third conveyor section is driven by a friction drive device having a plurality of friction/slip drive members in movable engagement with an edge portion of said connecting conveyor.

23. The dual helical conveyor system according to claim 22, wherein said friction drive device associated with said third conveyor section comprises a link chain having a plurality of friction/slip drive members attached thereto and positioned in movable engagement with said edge portion of said third conveyor system.

24. The dual helical conveyor system according to claim 23, wherein said first and second helical paths of said first and second conveyor sections are generally concentric.

25. The dual helical conveyor system according to claim 24, further comprising a conveyor belt return guide to guide said conveyor belts between said first and second helical paths, said conveyor belt return device comprising a generally circular shaped guide member mounted for rotation at a location between said product input/discharge sections to guide said conveyor belts therebetween.

26. A dual helical conveyer system, which comprises a first helical coveyer section having a first conveyer belt adapted to move in a first direction along a first helical path, a second helical conveyor section having a second conveyor belt adapted to move in a second direction opposite said first direction of said first belt along a second helical path, said second belt being located within said first belt, each of said first and second conveyor sections being independently driven by respective independently controlled friction drive mechanisms and having respective product input/discharge sections, a third conveyor section position and adapted to carry products between said product input/discharge sections of said first and second helical conveyor sections, and a conveyor belt return device to guide said conveyor belts between said first and second paths, said conveyor belt return device comprising a generally circular shaped guide member mounted for rotation at a location between said product input/discharge sections to guide said conveyor belts therebetween.

27. The dual helical conveyor system according to claim 26, wherein said third conveyor section has an arcuate configuration and positive drive mechanism is provided to drive said third conveyor section.

28. The dual helical conveyor system according to claim 26, wherein said third conveyor section has an arcuate configuration and a friction/slip drive mechanism is provided to drive said conveyor section.

29. The dual helical conveyor system according to claim 28, wherein said first and second helical paths of said first and second helical conveyor sections are generally concentric.

* * * * *